United States Patent
Ko

(10) Patent No.: US 9,053,371 B2
(45) Date of Patent: Jun. 9, 2015

(54) METHOD, SYSTEM AND COMPUTER PROGRAM PRODUCT FOR IDENTIFYING A LOCATION OF AN OBJECT WITHIN A VIDEO SEQUENCE

(71) Applicant: Texas Instruments Incorporated, Dallas, TX (US)

(72) Inventor: Dong-Ik Ko, McKinney, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 186 days.

(21) Appl. No.: 13/632,645

(22) Filed: Oct. 1, 2012

(65) Prior Publication Data

US 2013/0083972 A1   Apr. 4, 2013

Related U.S. Application Data

(60) Provisional application No. 61/540,591, filed on Sep. 29, 2011.

(51) Int. Cl.
*G06K 9/00* (2006.01)
*G06K 9/68* (2006.01)

(52) U.S. Cl.
CPC ........ *G06K 9/00771* (2013.01); *G06K 9/00342* (2013.01); *G06K 9/6857* (2013.01)

(58) Field of Classification Search
CPC . G06K 9/00; G06K 9/00342; G06K 9/00335; G06K 9/00771; G06K 9/00624; G06K 9/6857
See application file for complete search history.

(56) References Cited

U.S. PATENT DOCUMENTS

| | | | |
|---|---|---|---|
| 8,442,306 B2 * | 5/2013 | Garaas et al. | 382/154 |
| 8,666,119 B1 * | 3/2014 | Mallet et al. | 382/107 |
| 2003/0179824 A1 * | 9/2003 | Kan et al. | 375/240.1 |
| 2006/0072821 A1 * | 4/2006 | Wang | 382/173 |
| 2006/0233436 A1 * | 10/2006 | Ma et al. | 382/154 |
| 2007/0116357 A1 * | 5/2007 | Dewaele | 382/173 |
| 2007/0154066 A1 * | 7/2007 | Lin et al. | 382/103 |
| 2007/0242881 A1 * | 10/2007 | Gachignard et al. | 382/173 |
| 2008/0292192 A1 * | 11/2008 | Seki | 382/199 |
| 2009/0067676 A1 * | 3/2009 | Kempf et al. | 382/107 |
| 2009/0299232 A1 * | 12/2009 | Lanfermann et al. | 600/595 |
| 2012/0120285 A1 * | 5/2012 | Ko | 348/241 |
| 2012/0121165 A1 * | 5/2012 | Ko et al. | 382/154 |
| 2012/0121166 A1 * | 5/2012 | Ko et al. | 382/154 |
| 2012/0154409 A1 * | 6/2012 | Poot et al. | 345/474 |

\* cited by examiner

*Primary Examiner* — Chan Park
*Assistant Examiner* — Mia M Thomas
(74) *Attorney, Agent, or Firm* — Michael A. Davis, Jr.; Frank D. Cimino

(57) ABSTRACT

In response to detecting a motion within a video sequence, a determination is made of whether the motion is a particular type of movement. In response to determining that the motion is the particular type of movement, a location is identified within the video sequence of an object that does the motion.

15 Claims, 2 Drawing Sheets

METHOD, SYSTEM AND COMPUTER PROGRAM PRODUCT FOR IDENTIFYING A LOCATION OF AN OBJECT WITHIN A VIDEO SEQUENCE

CROSS-REFERENCE TO RELATED APPLICATION

This application claims priority to U.S. Provisional Patent Application Ser. No. 61/540,591, filed Sep. 29, 2011, entitled MOTION FLOW BASED HUMAN MOTION OBJECT SEGMENTATION AND METHOD, naming Dong-Ik Ko as inventor, which is hereby fully incorporated herein by reference for all purposes.

BACKGROUND

The disclosures herein relate in general to digital image processing, and in particular to a method, system and computer program product for identifying a location of an object within a video sequence.

A system may perform object segmentation for partitioning various located objects (within a digital image) into multiple segments. However, if the system performs the object segmentation with a high degree of complexity (e.g., in analysis of depth and regions of interest), then it can be relatively slow and inefficient, which increases consumption of computational resources. By comparison, if the system performs the object segmentation with a low degree of complexity, then it can be relatively unreliable.

SUMMARY

In response to detecting a motion within a video sequence, a determination is made of whether the motion is a particular type of movement. In response to determining that the motion is the particular type of movement, a location is identified within the video sequence of an object that does the motion.

DETAILED DESCRIPTION

Figure 1:
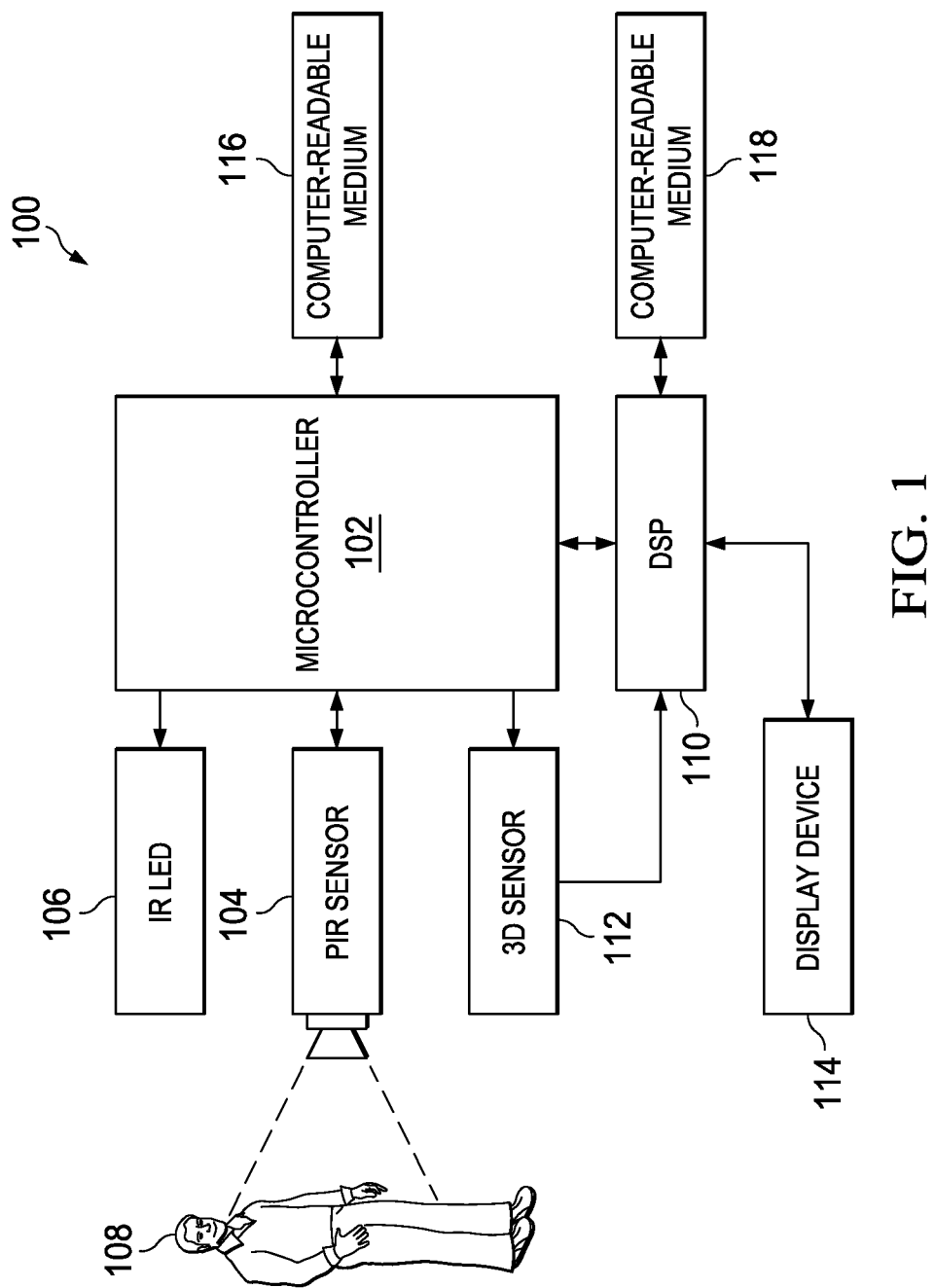
FIG. 1 is a block diagram of an information handling system of the illustrative embodiments.

FIG. 1 is a block diagram of an information handling system, indicated generally at 100, of the illustrative embodiments. In the example of FIG. 1, a microcontroller 102 selectively enables and disables a low resolution passive infrared ("PIR") sensor 104. The PIR sensor 104: (a) measures infrared light that radiates from physical objects within its field of view; and (b) in response thereto, outputs signals that represent such measurements. The microcontroller 102: (a) receives those signals from the PIR sensor 104; and (b) in response to those signals, detects then-current motion (if any) of such objects.

Also, the microcontroller 102 selectively enables and disables an infrared light emitting diode ("LED") 106. In response to the LED 106 being enabled by the microcontroller 102, the LED 106 outputs light for illuminating a space within the field of view of the PIR sensor 104. In this example, the physical objects include a human 108. In response to the LED 106 being disabled by the microcontroller 102, the LED 106 stops outputting such light.

The microcontroller 102 outputs information (e.g., commands and data) to, and receives information from, a digital signal processor ("DSP") 110. Further, the microcontroller 102 selectively enables and disables a three-dimensional ("3D") sensor 112, such as in response to a suitable command from the DSP 110. If the microcontroller 102 enables the 3D sensor 112, then the microcontroller 102 specifies whether such enablement is for: (a) a two-dimensional ("2D") operating mode, which has lower resolution, yet consumes less power; or (b) a 3D operating mode, which has higher resolution, yet consumes more power.

In response to the 3D sensor 112 being enabled by the microcontroller 102, the 3D sensor 112: (a) measures light that radiates from physical objects within its field of view, which substantially overlaps the field of view of the PIR sensor 104; and (b) in response thereto, outputs signals (e.g., as successive frames in a video sequence of digital images) that represent such measurements. In response to the 3D sensor 112 being disabled by the microcontroller 102, the 3D sensor 112 stops outputting those signals. The DSP 110: (a) receives those signals from the 3D sensor 112; (b) in response to those signals during the 2D operating mode, detects then-current motion (if any) of such objects; (c) in response to those signals (e.g., 3D point cloud data) during the 3D operating mode, detects various features of the then-current motion, computes 3D motion vectors of those features between successive frames (in the video sequence of digital images from the 3D sensor 112), and classifies those features to determine information about the then-current motion (e.g., shape, as represented by a 3D point cloud); and (d) in response to such vectors, features and classifications, outputs digital images to a display device 114 for depicting such objects.

The display device 114 receives and displays those images, which are viewable by a user (e.g., by the human 108). In one embodiment, the system 100 performs its operations in response to commands from the human 108, such as commands that the human 108 specifies via: (a) a touchscreen of the display device 114; and/or (b) physical gestures (e.g., hand movements) by the human 108, so that the system 100 analyzes the then-current motion to recognize such gestures after it identifies a location of the human 108 within the video sequence of digital images from the 3D sensor 112. The display device 114 is any suitable display device, such as a plasma display, a liquid crystal display ("LCD"), or an LED display.

The system 100 is formed by electronic circuitry components for performing the system 100 operations, implemented in a suitable combination of software, firmware and hardware. For example, the microcontroller 102 and the DSP 110 are computational resources for executing instructions of computer-readable software programs to process data (e.g., a database of information) and perform additional operations (e.g., communicating information) in response thereto. For operations of the microcontroller 102, such programs and data are stored in a memory of the microcontroller 102 and/or in a computer-readable medium 116 (e.g., hard disk drive, flash memory card, or other nonvolatile storage device). For operations of the DSP 110, such programs and data are stored in a memory of the DSP 110 and/or in a computer-readable medium 118.

Figure 2:
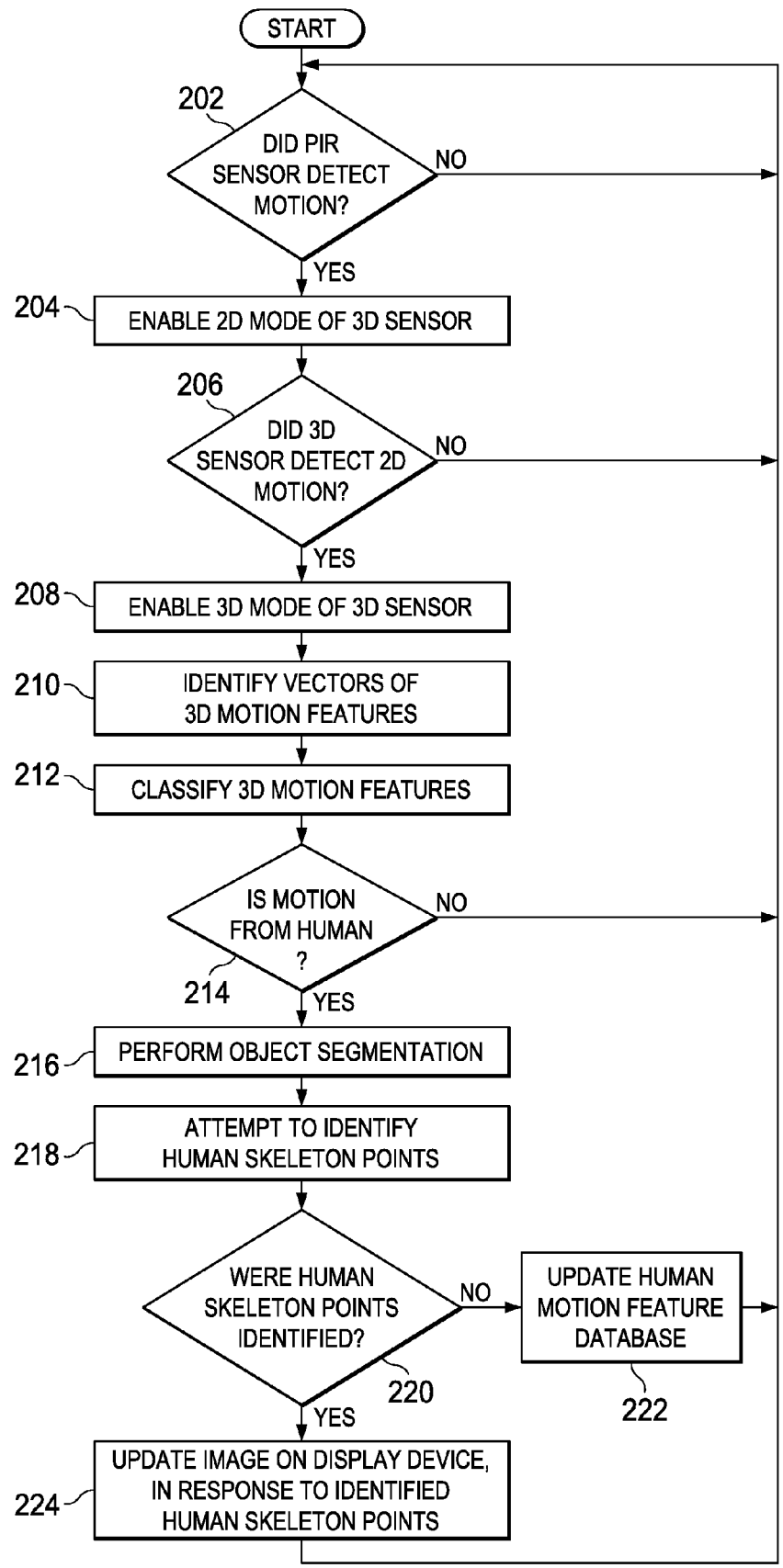
FIG. 2 is a flowchart of operation of the system of FIG. 1.

FIG. 2 is a flowchart of operation of the system 100. At a step 202, the microcontroller 102 enables the PIR sensor 104, disables the LED 106, and disables the 3D sensor 112. The operation self-loops at the step 202 until the microcontroller 102 (in response to signals from the PIR sensor 104) detects then-current motion of at least one physical object within the field of view of the PIR sensor 104.

In response to the microcontroller 102 detecting such then-current motion, the operation continues from the step 202 to a step 204. At the step 204, the microcontroller 102: (a) enables the 3D sensor 112 for the 2D operating mode; and (b) outputs a signal to inform the DSP 110 about such enablement. At a next step 206, the DSP 110 (in response to signals from the 3D sensor 112) determines whether it detects then-current motion of at least one physical object within the field of view of the 3D sensor 112.

In response to the DSP 110 determining that it does not detect such then-current motion, the operation returns from the step 206 to the step 202. Conversely, in response to the DSP 110 detecting such then-current motion, the operation continues from the step 206 to a step 208. At the step 208: (a) the DSP 110 commands the microcontroller 102 to enable the 3D sensor 112 for the 3D operating mode and to enable the LED 106 for illuminating a space within the field of view of the 3D sensor 112; and (b) the microcontroller 102 performs such enablement.

Further, the DSP 110 (in response to signals from the 3D sensor 112): (a) at a next step 210, detects various features of the then-current motion, and computes 3D motion vectors of those features between successive frames; and (b) at a next step 212, classifies those features to determine information about the then-current motion. At a next step 214, the DSP 110: (a) compares such vectors, features and classifications to various characteristics that distinguish a human type of movement from a non-human type of movement; and (b) in response to such comparison, determines whether the then-current motion is a human type of movement. The DSP 110 receives such characteristics (e.g., speed and kinetics) from a database of information in the computer-readable medium 118.

In response to the DSP 110 determining that the then-current motion is a non-human type of movement, the operation returns from the step 214 to the step 202. Conversely, in response to the DSP 110 determining that the then-current motion is a human type of movement, the operation continues from the step 214 to a step 216. At the step 216, the DSP 110: (a) identifies a location (within the video sequence of digital images from the 3D sensor 112) of the human object that does the then-current motion; and (b) in response to identifying such location, performs object segmentation for partitioning the located human object into multiple segments, in response to analysis by the DSP 110 of depth and regions of interest (within the video sequence of digital images from the 3D sensor 112).

At a next step 218, the DSP 110 attempts to identify human skeleton points of those multiple segments. At a next step 220, the DSP 110 determines whether it was successful in identifying the human skeleton points of those multiple segments. In response to determining that it was unsuccessful in identifying the human skeleton points of those multiple segments: (a) at a step 222, the DSP 110 updates the database of information in the computer-readable medium 118, so that the DSP 110 improves accuracy for its subsequent determinations of whether motion is a human type of movement; and (b) the operation returns from the step 222 to the step 202.

Referring again to the step 220, in response to determining that it was successful in identifying the human skeleton points of those multiple segments: (a) at a step 224, the DSP 110 outputs an updated digital image to the display device 114 for depicting the human skeleton points of those multiple segments; (b) the display device 114 receives and displays such image, which is viewable by a user; and (c) the operation returns from the step 224 to the step 202. The system 100 performs its various operations in a substantially real-time manner, so that a user (e.g., the human 108) of the system 100 barely (if at all) perceives delay between: (a) then-current motion of a physical object within the overlapping fields of view of the PIR sensor 104 and the 3D sensor 112; and (b) display (by the display device 114) of the updated digital image that is output by the DSP 110 in response thereto.

Accordingly, in response to the DSP 110 determining that the then-current motion is a human type of movement, the DSP 110: (a) identifies a location (within the video sequence of digital images from the 3D sensor 112) of the human object that does the then-current motion; and (b) in response to identifying such location, performs object segmentation for partitioning the located human object into multiple segments. In this hierarchically triggered manner, by focusing the object segmentation on the located human object that does the then-current motion (e.g., instead of stationary objects and non-human objects), the DSP 110 performs the object segmentation with improved speed and efficiency, while preserving reliability and reducing consumption of computational resources.

Optionally, in this same hierarchically triggered manner, in response to the DSP 110 determining that the then-current motion is a particular type of non-human movement (e.g., automobile movement and/or animal movement), the DSP 110 is operable to: (a) identify a location (within the video sequence of digital images from the 3D sensor 112) of the non-human object that does the then-current motion; (b) perform object segmentation for partitioning the located non-human object into multiple segments; (c) attempt to identify skeleton points of those multiple segments; (d) in response to determining that it was unsuccessful in identifying the skeleton points of those multiple segments, update the database of information in the computer-readable medium 118, so that the DSP 110 improves accuracy for its subsequent determinations of whether motion is the particular type of non-human movement; and (e) in response to determining that it was successful in identifying the skeleton points of those multiple segments, output an updated digital image to the display device 114 for depicting the skeleton points of those multiple segments (e.g., in addition to, or instead of, the human skeleton points), so that the display device 114 receives and displays such image, which is viewable by a user. For example, to determine whether the then-current motion is the particular type of non-human movement, the DSP 110 is operable to compare the then-current motion's vectors, features and classifications to various characteristics that distinguish the particular type of non-human movement from other types of movement.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof Although illustrative embodiments have been shown and described by way of example, a wide range of alternative embodiments is possible within the scope of the foregoing disclosure.

What is claimed is:

1. A method performed by a combination of electronic circuitry components for identifying a location of an object within a video sequence, the method comprising:
    detecting motion of the object within a field of view of a passive infrared sensor, in response to signals from the passive infrared sensor;
    in response to the detecting of the motion of the object within the field of view of the passive infrared sensor, enabling a three-dimensional sensor to operate in a two-dimensional operating mode;
    detecting motion of the object within a field of view of the three-dimensional sensor, in response to signals from the three-dimensional sensor operating in the two-dimensional operating mode;
    in response to the detecting of the motion of the object within the field of view of the three-dimensional sensor, enabling the three-dimensional sensor to operate in a three-dimensional operating mode;
    determining whether the motion is a human type of movement, in response to signals from the three-dimensional sensor operating in the three-dimensional operating mode;
    in response to determining that the motion is the human type of movement, identifying the location within the video sequence of the object that does the motion; and
    in response to the identifying of the location of the object within the video sequence, partitioning the located object into multiple segments, and identifying human skeleton points of the multiple segments;
    wherein determining whether the motion is the human type of movement includes: detecting features of the motion; computing three-dimensional motion vectors of the features between successive frames of the video sequence from the three-dimensional sensor; and comparing the features and three-dimensional motion vectors to characteristics that distinguish the human type of movement from a non-human type of movement.

2. The method of claim 1, and comprising:
    outputting an image to a display device for displaying the human skeleton points.

3. The method of claim 1, and comprising:
    in response to the detecting of the motion of the object within the field of view of the three-dimensional sensor, illuminating a space within the field of view of the three-dimensional sensor.

4. The method of claim 3, wherein illuminating the space includes: illuminating the space with an infrared light emitting diode.

5. The method of claim 1, and comprising:
    in response to determining that the motion is the non-human type of movement, updating a database of information to improve accuracy for a determination of whether subsequent motion is the human type of movement.

6. A system for identifying a location of an object within a video sequence, the system comprising:
    a combination of electronic circuitry components for: detecting motion of the object within a field of view of a passive infrared sensor, in response to signals from the passive infrared sensor; in response to the detecting of the motion of the object within the field of view of the passive infrared sensor, enabling a three-dimensional sensor to operate in a two-dimensional operating mode; detecting motion of the object within a field of view of the three-dimensional sensor, in response to signals from the three-dimensional sensor operating in the two-dimensional operating in response to the detecting of the motion of the object within the field of view of the three-dimensional sensor, enabling the three-dimensional sensor to operate in a three-dimensional operating mode; determining whether the motion is a human type of movement, in response to signals from the three-dimensional sensor operating in the three-dimensional operating mode; in response to determining that the motion is the human type of movement, identifying the location within the video sequence of the object that does the motion; and, in response to the identifying of the location of the object within the video sequence, partitioning the located object into multiple segments, and identifying human skeleton points of the multiple segments;
    wherein determining whether the motion is the human type of movement includes: detecting features of the motion; computing three-dimensional motion vectors of the features between successive frames of the video sequence from the three-dimensional sensor; and comparing the features and three-dimensional motion vectors to characteristics that distinguish the human type of movement from a non-human type of movement.

7. The system of claim 6, wherein the combination of electronic circuitry components is for outputting an image to a display device for displaying the human skeleton points.

8. The system of claim 6, wherein the combination of electronic circuitry components is for: in response to the detecting of the motion of the object within the field of view of the three-dimensional sensor, illuminating a space within the field of view of the three-dimensional sensor.

9. The system of claim 8, wherein illuminating the space includes: illuminating the space with an infrared light emitting diode.

10. The system of claim 6, wherein the combination of electronic circuitry components is for: in response to determining that the motion is the non-human type of movement, updating a database of information to improve accuracy for a determination of whether subsequent motion is the human type of movement.

11. A non-transitory computer-readable medium storing instructions that are processable by an instruction execution apparatus for causing the apparatus to perform a method comprising: detecting motion of an object within a field of view of a passive infrared sensor, in response to signals from the passive infrared sensor; in response to the detecting of the motion of the object within the field of view of the passive infrared sensor, enabling a three-dimensional sensor to operate in a two-dimensional operating mode; detecting motion of the object within a field of view of the three-dimensional sensor, in response to signals from the three-dimensional sensor operating in the two-dimensional operating mode; in response to the detecting of the motion of the object within the field of view of the three-dimensional sensor, enabling the three-dimensional sensor to operate in a three-dimensional operating mode; determining whether the motion is a human type of movement, in response to signals from the three-dimensional sensor operating in the three-dimensional operating mode; in response to determining that the motion is the human type of movement, identifying a location within a video sequence of the object that does the motion; and, in response to the identifying of the location of the object within the video sequence, partitioning the located object into multiple segments, and identifying human skeleton points of the multiple segments;

wherein determining whether the motion is the human type of movement includes: detecting features of the motion; computing three-dimensional motion vectors of the features between successive frames of the video sequence from the three-dimensional sensor; and comparing the features and three-dimensional motion vectors to characteristics that distinguish the human type of movement from a non-human type of movement.

12. The computer-readable medium of claim 11, wherein the method comprises outputting an image to a display device for displaying the human skeleton points.

13. The computer-readable medium of claim 11, wherein the method comprises: in response to the detecting of the motion of the object within the field of view of the three-dimensional sensor, illuminating a space within the field of view of the three-dimensional sensor.

14. The computer-readable medium of claim 13, wherein illuminating the space includes: illuminating the space with an infrared light emitting diode.

15. The computer-readable medium of claim 11, wherein the method comprises: in response to determining that the motion is the non-human type of movement, updating a database of information to improve accuracy for a determination of whether subsequent motion is the human type of movement.

* * * * *